United States Patent
Ng-Thow-Hing et al.

(10) Patent No.: US 8,116,908 B2
(45) Date of Patent: Feb. 14, 2012

(54) MULTI-MODAL PUSH PLANNER FOR HUMANOID ROBOTS

(75) Inventors: Victor Ng-Thow-Hing, Sunnyvale, CA (US); Kris Hauser, Menlo Park, CA (US); Hector Gonzalez-Banos, Mountain View, CA (US)

(73) Assignee: Honda Motor Co., Ltd., Tokyo (JP)

(*) Notice: Subject to any disclaimer, the term of this patent is extended or adjusted under 35 U.S.C. 154(b) by 831 days.

(21) Appl. No.: 12/134,078

(22) Filed: Jun. 5, 2008

(65) Prior Publication Data

US 2008/0306628 A1 Dec. 11, 2008

Related U.S. Application Data

(60) Provisional application No. 60/933,909, filed on Jun. 8, 2007.

(51) Int. Cl.
*G06F 19/00* (2011.01)
(52) U.S. Cl. ...................................................... 700/245
(58) Field of Classification Search .................. 700/245, 700/250, 255, 253; 901/1, 14; 701/23, 26, 701/200; 414/1
See application file for complete search history.

(56) References Cited

U.S. PATENT DOCUMENTS

| | | | |
|---|---|---|---|
| 4,638,445 A * | 1/1987 | Mattaboni | 701/23 |
| 4,852,018 A | 7/1989 | Grossberg et al. | |
| 5,438,517 A * | 8/1995 | Sennott et al. | 701/213 |
| 5,889,926 A * | 3/1999 | Bourne et al. | 700/255 |
| 5,980,084 A * | 11/1999 | Jones et al. | 700/95 |
| 6,229,552 B1 | 5/2001 | Koga et al. | |
| 6,253,147 B1 * | 6/2001 | Greenstein | 701/202 |
| 6,292,715 B1 | 9/2001 | Rongo | |
| 6,493,607 B1 * | 12/2002 | Bourne et al. | 700/255 |
| 6,917,855 B2 * | 7/2005 | Gonzalez-Banos et al. | 700/245 |
| 6,934,615 B2 * | 8/2005 | Flann et al. | 701/50 |
| 6,986,117 B1 * | 1/2006 | Teig et al. | 716/129 |
| 7,057,367 B2 * | 6/2006 | Furuta et al. | 318/568.12 |
| 7,211,980 B1 * | 5/2007 | Bruemmer et al. | 318/587 |
| 2004/0019402 A1 * | 1/2004 | Bourne et al. | 700/165 |
| 2004/0030741 A1 | 2/2004 | Wolton et al. | |
| 2006/0213167 A1 | 9/2006 | Koselka et al. | |

(Continued)

OTHER PUBLICATIONS

Alami, R. et al., "Two Manipulation Planning Algorithms," Algorithmic Foundations of Robotics, 1995, Goldberg, K. et al. (eds.), pp. 109-125, Wellesley, MA.

(Continued)

*Primary Examiner* — John Nguyen
*Assistant Examiner* — Michael Ng
(74) *Attorney, Agent, or Firm* — Fenwick & West LLP; Mark E. Duell (57) ABSTRACT

Multi-modal planning method and system that search a path for the most constrained mode first, and then expands the searches for path in a less constrained mode. By searching the path for the most constrained mode first, less resource are wasted on searching for paths that does not result in a feasible path in the most constrained mode. Multi-modal planning is performed by precomputing feasibility and utility of transition configurations of two adjacent modes. The feasibility is used to exclude non-feasible transition configurations in the most constrained mode from being sampled. The utility is used to bias sampling of the transition configuration so that transition configurations with higher utility are sampled with higher probability. Paths of configurations with higher utility and efficiency are obtained by biasing the sampling of the transition configurations.

21 Claims, 8 Drawing Sheets

U.S. PATENT DOCUMENTS

| | | | |
|---|---|---|---|
| 2006/0241809 A1* | 10/2006 | Goswami et al. | 700/245 |
| 2007/0094174 A1* | 4/2007 | Hamadi et al. | 706/19 |
| 2007/0112461 A1 | 5/2007 | Zini et al. | |
| 2010/0168950 A1* | 7/2010 | Nagano | 701/25 |
| 2011/0035050 A1* | 2/2011 | Kim et al. | 700/246 |

OTHER PUBLICATIONS

Amato, N. et al., "A Randomized Roadmap Method for Path and Manipulation Planning," Proceedings of the 1996 IEEE International Conference on Robotics and Automation, 1996, pp. 113-120, vol. 1.

"Asmio Year 2000 Model," Honda Motor Co., Ltd., 2000, [Online] [Retrieved on Sep. 5, 2008], Retrieved from the Internet<URL:http://world.honda.com/ASIMO/technology/spec.html>.

Balkcom, D. et al., "Introducing Robotic Origami Folding," IEEE International Conference on Robotics and Automation, Apr. 2004, pp. 3245-3250, vol. 4.

Ballard, D.H., "Generalizing in Hough Transform to Detect Arbitrary Shapes," Pattern Recognition, 1981, pp. 111-122, vol. 13, No. 2.

Barraquand, J. et al., "A Random Sampling Scheme for Path Planning," Giralt, G. et al. (eds.), Proceedings International Symposium on Robotics Research, 1996, pp. 249-264.

Barraquand, J. et al., "Robot Motion Planning: A Distributed Representation Approach," International Journal of Robotics Research, Dec. 1991, pp. 628-649, vol. 10, No. 6.

Benjamin, M.R., "Abstract of Interval Programming: A Multi-Objective Optimzation Model for Autonomous Vehicle Control," Ph.D. Thesis, Bruwon University, May 2002, 166 pages.

Bretl, T., "Motion Planning of Multi-Limbed Robots Subject to Equilibrium Constraints: The Free-Climbing Robot Problem," International Journal of Robotics Research, Apr. 2006, pp. 317-342, vol. 25, No. 4.

Brooks, R., "A Robust Layered Control System for a Mobile Robot," IEEE Journal of Robotics and Automation, Mar. 1986, vol. RA-2, No. 1.

Casal, A., "Reconfiguration Planning for Modular Self-Reconfigurable Robots," Ph.D. Thesis, Aero & Astro Dept., Stanford University, 2001.

Challou, D. et al., "Parallel Robot Motion Planning," Proceedings IEEE Int. Conf. on Robotis and Automation, May 4, 1993, pp. 46-51, vol. 2.

Chang, H. et al., "Assembly Maintainability Study with Motion Planning," Proceedings IEEE International Conference on Robotis and Automation, 1995, pp. 1012-1019.

Dollar, A. et al., "A Robust Compliant Grasper Via Shape Deposition Manufacturing," IEEE/ASME Transactions on Mechatronics, Apr. 2006, pp. 154-161, vol. 11, No. 2.

Drumwright, E. et al., "The Task Matrix Framework for Platform-Independent Humanoid Programming," in Humanoids 2006, Proceedings of the 2006 $6^{th}$ IEEE-RAS International Conference on Humanoid Robots, Genova, Italy, pp. 321-326.

Gat, E., "On Three-Layer Architectures," in Artificial Intelligence and Mobile Robots, 1998, Bonnasso, R.P. et al. (eds.), AAAI Press, pp. 195-210.

Gerkey, B.P. et al., "The Player/Stage Project: Tools for Multi-Robot and Distributed Sensor Systems," Proceedings of the International Conference on Advanced Robotics (ICAR 2003), Caimbra, Portugal, Jun. 30-Jul. 3, 2003, pp. 317-323.

Gheissari, N. et al., "Motion Analysis: Model Selection and Motion Segmentation," Proceedings of the $12^{th}$ International Conference on Image Analysis and Processing (ICIAP 03), IEEE, 2003, 7 pages.

Gilbert, E.G. et al., "A Fast Procedure for Computing Distance Between Objects in Three-Dimensional Space," IEEE Journal of Robotics and Automation, Apr. 1988, vol. 4, No. 2.

Goldwasser, M. et al., "Complexity Measures for Assembly Sequences," Proceedings of the 1996 IEEE International Conference on Robotics and Automation, Apr. 1996, pp. 1581-1587.

Gottschalk, S. et al, "OBB-Tree: A Hierarchical Structure for Rapid Interference Detection," Computer Graphics (SIGGRAPH '96 Proceedings), ACM, 1996, pp. 171-180.

Hartley, R.I. et al., "Multiple View Geometry in Computer Vision," 2004, Cambridge University Press, $2^{nd}$ edition, pp. 205-212.

Hauser, K. et al., "Multi-Modal Motion Planning for a Humanoid Robot Manipulation Task," In proceedings of the International Symposium of Robotics Research. Hiroshima, Japan, 2007, pp. 1-11.

Hauser, K. et al., "Non-Gaited Humanoid Locomotion Planning," Proc. IEEE Intl. Conf. on Humanoid Robotics, 2005, 6 pages.

Hayes-Roth, B., "A Blackboard Architecture for Control," Artificial Intelligence, 1985, pp. 251-321, vol. 26.

Haynes, G. et al., "Gait Regulation and Feedback on a Robotic Climbing Hexapod," Proceedings of Robotics: Science and Systems, Aug. 2006, 8 pages.

Hing, V.N. et al., "Expanding Task Functionality in Established Humanoid Robots," In proceedings of the IEEE Conference on Humanoid Robotics. Pittsburg, PA, 2007, 7 pages.

Horsch, T. et al., "Motion Planning for Many Degrees of Freedom—Random Reflections at C-Space Obstacles," Proceedings 1994 IEEE International Conference on Robotics and Automation, 1994, pp. 3318-3323, vol. 4.

Hsu, D. et al., "Path Planning in Expansive Configuration Spaces," International Journal of Computational Geometry & Applications, 1999, pp. 495-512, vol. 9, No. 4-5.

Ierusalimschy, R., *Programming in Lua*, 2006, 325 pages.

Kanehiro, F. et al., "Openhrp: Open Architecture Humanoid Robotics Platform," International Journal of Robotics Research, Feb. 2004, pp. 155-165, vol. 23, No. 2.

Kavraki, L. et al., "Randomized Preprocessing of Configurations Space for Fast Path Planning," Proceedings 1994 IEEE International Conference on Robotics and Automation, 1994, pp. 2138-2139, vol. 3.

Kavraki, L. et al., "Randomized Query Processing in Robot Path Planning," ACM Symp. On Theory of Computing, 1995, pp. 353-362.

Kavraki, L. et al., "Probabilistic Roadmaps for Path Planning in High-Dimensional Configuration Space," IEEE Trans. on Robotics and Automation, Aug. 1996, pp. 566-580, vol. 12, No. 4.

Kavraki, L. et al., "Random Networks in Configuration Space for Fast Path Planning," Ph.D. Thesis, Stanford University, 1995, 150 pages.

Khatib, O., "Real-Time Obstacle Avoidance for Manipulation and Mobile Robots," International Journal of Robotics Research, 1986, pp. 90-98, vol. 5, No. 1.

Koo, T.J. et al., "Multi-Modal Control of Systems with Constraints," Proceedings of the 40th IEEE Conference on Decision and Control, 2001, pp. 2075-2080, vol. 3.

Lamiraux, F. et al., "On the Expected Complexity of Random Path Planning," Proceedings 1996 IEEE International Conference on Robotics and Automation, Apr. 1996, pp. 3014-3019.

Latombe, J.-C., "Robot Motion Planning," Chapter 4, 1991, Kluwer Academic Publishers, Boston, MA, pp. 153-199.

Lavalle, S.M. et al., "Randomized Kinodynamic Planning," Proceedings 1996 IEEE International Conference on Robotics and Automation, 1999, pp. 473-479, vol. 1.

Lee, H. et al., "Quadruped Robot Obstacle Negotiation Via Reinforcement Learning," Proceedings of the 2006 IEEE International Conference on Robotics and Automation, May 2006, pp. 3003-3010.

Lynch, K.M. et al., "Stable Pushing: Mechanics, Controllability, and Planning," International Journal of Robotics Research, Dec. 1996, pp. 533-556, vol. 15, No. 6.

Motwani, R. et al., "Randomized Algorithms," Chapter 5, 1995, Cambridge University Press, pp. 101-126.

Nielsen, C.L. et al., "A Two-Level Fuzzy PRM for Manipulation Planning," Proceedings of the 2000 IEEE/RSJ Conference on Intelligent Robots and Systems, 2000, 6 pages.

Nieuwenhuisen, D. et al., "An Effective Framework for Path Planning Amidst Movable Obstacles," Workshop on Algorithmic Foundations of Robotics (WAFR), 2006, 16 pages.

PCT International Search Report and Written Opinion, PCT/US08/65677, Sep. 11, 2008, 9 pages.

Peshkin, M.A. et al., "The Motion of a Pushed, Sliding Workpiece," IEEE Journal of Robotics Automation, Dec. 1988, pp. 569-598, vol. 4, No. 6.

Pettersson, P.O., "Samling-Based Path Planning for an Autonomous Helicopter," Thesis, Linköping University, Sweden, 2006, 147 pages.

Quinlan, S., "Efficient Distance Computation Between Non-Convex Objects," Proceedings 1994 IEEE International Conference on Robotics and Automation, 1994, pp. 3324-3329, vol. 4.

Reif, J.H., "Complexity of the Mover's Problem and Generalizations," Proc. IEEE Symp. on Foundations of Computer Science, 1979, pp. 421-427.

Shoemake, K., "Animating Rotation with Quaternion Curves," Computer Graphics (SIGGRAPH '85 Proceedings), Jul. 1985, pp. 245-254, vol. 19, No. 3.

Simeon, T. et al., "A General Manipulation Task Planner," Workshop on Algorithmic Foundations of Robotics (WAFR), 2002, pp. 1-17.

Thorisson, K. et al., "Whiteboards: Scheduling Blackboards for Semantic Routing of Messages and Streams," in AAAI Workshop on Modular Construction of Human-Like Intelligence, Twentieth Annual Conference on Artificial Intelligence, Jul. 10, 2005, pp. 16-23, Pittsburgh, PA.

Vaughan, R.T. et al., "On Device Abstractions for Portable, Reusable Robot Code," IEEE/RSJ International Conference on Intelligent Robots and Systems (IROS 2003), Oct. 2003, pp. 2121-2427, Las Vegas, NV.

Wagner, D. et al., "ARToolKitPlus for Pose Tracking on Mobile Devices," in Computer Vision Winter Workshop 2007, Feb. 6-8, 2007, St. Lambrecht, Austria.

Wilfong, G., "Motion Planning in the Presence of Movable Obstacles," Proc. of the Fourth Annual Symposium on Computational Geometry, 1988, pp. 279-288.

Wilson, R., "On Geometric Assembly Planning," Ph.D. Thesis, Stanford University, Mar. 1992, 153 pages.

Yang, A. et al., "Robotalk:: Controlling Arms, Bases and Androids Through a Single Motion Interface," in Proceedings of the 12$^{th}$ International Conference on Advanced Robotics, Jul. 18-20, 2005, pp. 280-287, Seattle.

* cited by examiner

MULTI-MODAL PUSH PLANNER FOR HUMANOID ROBOTS

CROSS-REFERENCE TO RELATED APPLICATIONS

This application claims priority under 35 U.S.C. §119(e) to U.S. Provisional Patent Application No. 60/933,909 entitled "Multi-Modal Motion Planning For A Humanoid Robot Manipulation Task," filed on Jun. 8, 2007, the subject matter of which is incorporated by reference herein in its entirety.

FIELD OF THE INVENTION

The present invention is related to a method and system for planning motions in a robot, more specifically to a method and system for planning motions involving multiple modes where each mode is subject to different constraints.

BACKGROUND OF THE INVENTION

In order to accomplish a certain task, robots or other devices may need to perform operations in multiple modes. One mode (for example, walking) may impose one set of constraints on the configuration of the robot while another mode (for example, pushing) may impose another set of constraints on the configuration of the robot. Such multi-modal planning is found in many areas of robotics including legged locomotion and reconfigurable robots.

Algorithms for planning single-mode motions may not be suitable for planning multi-modal operations. Single-mode planning methods assume that all the motions of robots or devices are subject to the same set of constraints. Effective single-mode motion planning methods such as probabilistic roadmap (PRM) methods are currently available to obtain efficient paths to reach the target configuration of robots. In multi-modal planning, however, not only the motions within each mode but also transition configurations between two adjacent modes must be decided. The transition configuration is a configuration that the robot takes before transitioning from one mode to another mode. In multi-modal operations, transition from one mode to another mode must be made via the transition configuration. The choice of the transition configuration also significantly impacts the effectiveness of overall path to the target configuration. Conventional single-mode planning methods, however, are not effective in producing effective transition configurations.

In mutimodal operations, there may be multiple transition configurations or a continuous set of transition configurations for transitioning from one mode to another mode. One way of addressing the continuous set of transition configurations is to discretized the continuation set of transition configurations and expand path searches from the discretized transition configurations. If the discretization of the transition configurations is too sparse, transition configurations leading to the target configuration may be missed. In such case, a path to the target configuration may not be obtained from the discretized points of transition configurations. Conversely, if the discretization is too dense, excessive resources may be needed to conduct searches for the path of configurations.

Pushing operation is a useful form of manipulation that involves multi-modal motion planning. In a humanoid robot, for example, the robot may first walk (a first mode) to the table, reach its arm (a second mode) toward the object, and then push (a third mode) the object to a certain location. Even for a simple pushing task, the robot may need to perform a number of pushes. Between the pushes, the robot may need to reach or retract its arm, switch hands, or walk to a new location while satisfying various sets of constraints. Further, some pushes may be irreversible because of limited reach of the manipulators and other constraints on the configuration of the robots or devices. For these reasons and others, pushing motions need to be planned carefully to achieve a target objective.

SUMMARY OF THE INVENTION

Embodiments of the present invention provide a method, a system and a computer readable storage medium for planning motions for a subject device (e.g., a humanoid robot) operable in two or more modes (e.g., walk, reach/retract and push). Each mode has a set of constraints that must be followed by the subject device. A first transition configuration of the subject device is selected from candidate transition configurations shared by the most constrained mode (e.g., push mode) and a mode adjacent to the most constrained mode (e.g., reach/retract mode) and closer to an initial configuration of the subject device. A search is performed to obtain a first series of configurations between the first transition configuration and the initial configuration. Another search is also performed to identify the path from the first transition configuration to the target configuration.

In one embodiment, a tree is generated to include multiple nodes. Each node represents the configuration that may be taken by the subject device to reach the target configuration from the initial configuration. To expand the tree with a sampled transition configuration, distances between the nodes of the tree and the sampled transition configuration are calculated. The sampled transition configuration is connected to a node with the shortest metric distance.

In one embodiment, a feasibility table and a utility table are generated and stored. The feasibility table stores information about feasibility of reaching transition configurations for the first transition configuration from the first mode. The utility table stores the utility of the candidate transition configurations for the first transition configuration. The utility represents changes in configurations effective in reaching the target configuration. The transition configuration is sampled based on the utility and the feasibility of the transition configuration.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The configuration of a subject device is a specification of the position and the orientation of each rigid components of a subject device with respect to a fixed coordinate system. For example, a configuration of the subject device may be specified by parameters $q=(q_0, q_1, \ldots, q_{d-1})$, where d is the number of degrees of freedom of the subject device. The set of all configuration forms the configuration space of the subject device. In each mode, the subject devices may take a subset of the configurations within the configuration space due to various constraints imposed by, among others, obstacles, kinematics constraints, self-collision, and dynamics of the subject device.

An object configuration is the configuration of an object being manipulated by the subject device. The configuration of the subject device and the object configuration are collectively referred to as "configuration" herein. The object configuration may be represented by parameters $q_{obj}=(q_0, q_1, \ldots, q_{d'-1})$, where d' is the number of degrees of freedom of the object being manipulated. For example, the object configuration of an object pushed on a flat surface has three degrees of freedom (two horizontal coordinates and the orientation of the object).

The subject device may be any device that has one or more degrees of freedom and is operable in two or more modes where each mode imposes different sets of constraints on the configuration of the subject device. The subject device includes, among others devices, a robot, industrial equipment, a vehicle, virtual devices and computer-animated characters.

Two modes are referred to as being adjacent if transition between the two modes is permissible. To transition from one mode to another, the modes must share at least one common configuration (hereinafter referred to as a "transition configuration") that can be taken by the subject device in both modes.

Multi-modal motions are planned by first performing searches on the most constrained mode of operation, and then expanding the search to other modes. Searching motions for the most constrained mode involves sampling transition configurations for transition between the most constrained modes and a mode adjacent to the most constrained mode. The transition configurations are sampled so that non-feasible configurations are precluded. Further, the transition configurations are also sampled in a manner so that transition configurations with higher utility are sampled with a higher probability. After sampling the transition configurations, a series of configurations between a starting transition configuration and an ending transition configuration are searched within a single-mode using a conventional single-mode motion planning method.

Overview of Multi-Modal Planning

Figure 1:
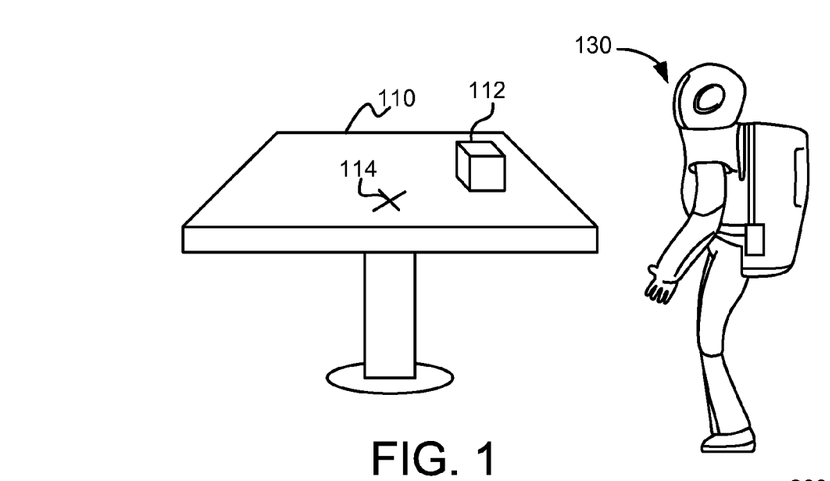
FIG. 1 is a diagram illustrating a robot in an environment including an object for pushing, according to one embodiment of the present invention.

FIG. 1 illustrates a robot 130 in an environment including an object 112 for pushing, according to one embodiment of the present invention. The robot 130 is a humanoid robot that is capable of performing various operations akin to human motions. One example of such a robot is ASIMO advanced humanoid robot of Honda Motor Co., Ltd., Tokyo, Japan. Although the following embodiments are described below with reference to a humanoid robot 130, the present invention is not limited to humanoid robots and may be used in other types of robots and mechanical devices that are operable in multiple modes.

The robot 130 may operate in multiple modes to accomplish certain tasks. For example, the robot 130 of FIG. 1 may walk (a first mode) over to the table 110, reach/retract its arm (a second mode), and push (a third mode) an object 112 to a target location 114. In order to accomplish such tasks, the robot 130 must take a series of configurations. By operating in different modes, the robot 130 may perform diverse types of tasks more effectively relative to operating only in a single mode.

The configuration of the robot 130 may include, among others, planar coordinate of the robot 130 ($x_{robot}$, $y_{robot}$, $\theta_{robot}$), the joint angles for each arm, open/close parameter for each hand, and the joint angles of the legs. The object configuration of the object being pushed has three parameters: two parameters representing a planar horizontal coordinate (x and y) and one parameter representing the orientation of the object. The configuration of the overall system includes the configuration of the robot 130 and the object configuration.

In one or more embodiments, the robot 130 operates in at least the following five distinct modes: (i) a walking mode, (ii) a reach/retract left arm mode, (iii) reach/retract right arm mode, (iv) a mode where an object is pushed using the left arm, and (v) a mode where an object is pushed using the right arm. Each of these modes imposes different sets of constraints on the configuration of the robot 130. In a walking mode, for example, the left and right legs of the robot 130 must operate in a predefined series of configurations so that the robot 130 walks to a destination without tipping over or causing collision between different parts of the body (i.e., self-collision). Likewise, in a reach/retract mode, the arms must be coordinated so that self-collisions or collisions with other obstacles (e.g., table 110) do not occur. In a push mode, the arm and hand of the robot must move along a path so that the tip of the hand maintains contact with the object and pushes the object in the right direction.

Figure 2A:
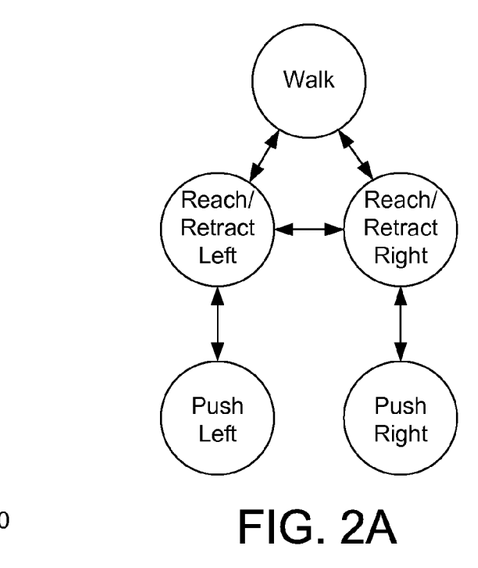
FIG. 2A is a mode transition diagram illustrating permissible transitions between modes, according to one embodiment of the present invention.

FIG. 2A is a mode transition diagram illustrating permissible transitions between the modes in a robot 130, according to one embodiment of the present invention. The robot 130 is allowed to transition from the walking mode to the pushing mode via the reach/retract mode but not directly from the walking mode to the pushing mode. After retracting the arms, the robot 130 may return to the walking mode to walk to a different location. Direct transition between the reach/retract right hand mode and reach/retract left arm mode is also allowed so that the robot 130 changes the hand pushing the object. The transition diagram of FIG. 2A is merely illustrative. Modes may be added, replaced or omitted depending on the configuration of subject device, the object being manipulated or the task the subject device is designed to accomplish.

Figure 2B:
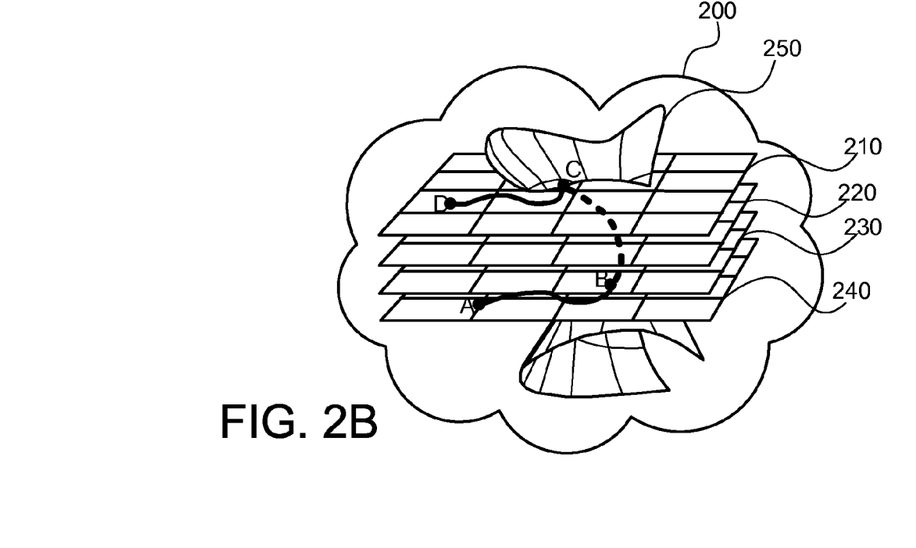
FIG. 2B is a conceptual diagram illustrating manifolds representing configurations that can be taken by a system including a subject device and an object being manipulated by the subject device.

FIG. 2B is a conceptual diagram illustrating manifolds 210 through 250 representing configurations that can be taken by the system including the robot 130 and the object 112 being manipulated. The robot 130 and the object 112 may take any configuration within configuration space 200 absent any constraints imposed by modes. In one embodiment, the configuration space 200 is defined so that awkward or ineffective movements of the robot are prevented (e.g., pushing an object without facing the object).

Within the configuration space 200 are the manifolds 210 through 250. Each manifold represents a set of configurations of the robot 130 and the object 112 that may be taken when the robot 130 is operating in a mode. The manifolds 210 to 240, for example, may indicate configurations of the robot 130 and the object 112 in a reach/retract mode at four different planar coordinates of the robot 130 ($x_{robot}$, $y_{robot}$, $\theta_{robot}$). The manifold 250 represents configurations that the robot 130 and the object 112 may take in a pushing mode.

Assume that the manifolds 210 through 250 represent modes for reaching/retracting an arm and pushing the object 112 to the target location 114 using the tip of the robot's hand. The configuration of robot 130 before reaching out the arm is represented by a point A on the manifold 240. The robot 130 reaches its arm so that the system takes configuration B. While transitioning from configuration A to configuration B, the robot 130 takes a series of configuration within the manifold 240. The configuration of the object 112 does not change during such transition because the object 112 stays on the table 110 without any manipulation. After taking configuration B, the robot 130 may push the object 112 by taking a series of configurations within the manifold 250. The tip of the robot's hand starts touching the object 112 at configuration B. Between configurations B and C, the robot 130 is subject to the constraints that (i) the robot's hand maintains contact with the object 112, and (ii) a normal vector at the contact point of the robot's hand and the object 112 maintains a horizontal direction to push the object 112 without tipping over the object 112. The configuration of the object 112, along with the configuration of the robot 130, changes between configuration B and configuration C because the robot 130 pushes the object 112. After taking a series of configurations within the manifold 250, the system takes the configuration C. After taking the configuration C, the robot 130 retracts its arm so that the system takes configuration D. The system takes a series of configurations as represented by a line C-D while its arm is being retracted to configuration D.

In FIG. 2B, configurations B and C are transition configurations that are shared by both the reach/retract mode and the push mode. The major difficulty in planning motions involving multiple modes lies in determining such transition configurations that are effective in reaching the target configuration. After the transitional configurations to and from a mode are determined, a series of configurations within a mode may be obtained by using conventional single-mode planning described, for example, in Oussama Khatib, "Real-Time Obstacle Avoidance for Manipulators and Mobile Robots," International Journal of Robotics Research, Vol. 5, No. 1, 1986, pp. 90-98, which is incorporated by reference herein in its entirety.

In one or more embodiments of the present invention, search for the paths of configurations starts and expands from the most constrained mode. The most constrained mode refers to a mode that is subject to the most restrictive constraints, and thus, requires the most amount of computation and resource to obtain an effective series of configurations within the mode. The constraints may be due to, among other reasons, presence of obstacles, kinematics limits of the robot, unpredictable or unstable control characteristics of motions, and the need for an effector to maintain certain relationship with the object being manipulated.

Figure 3A:
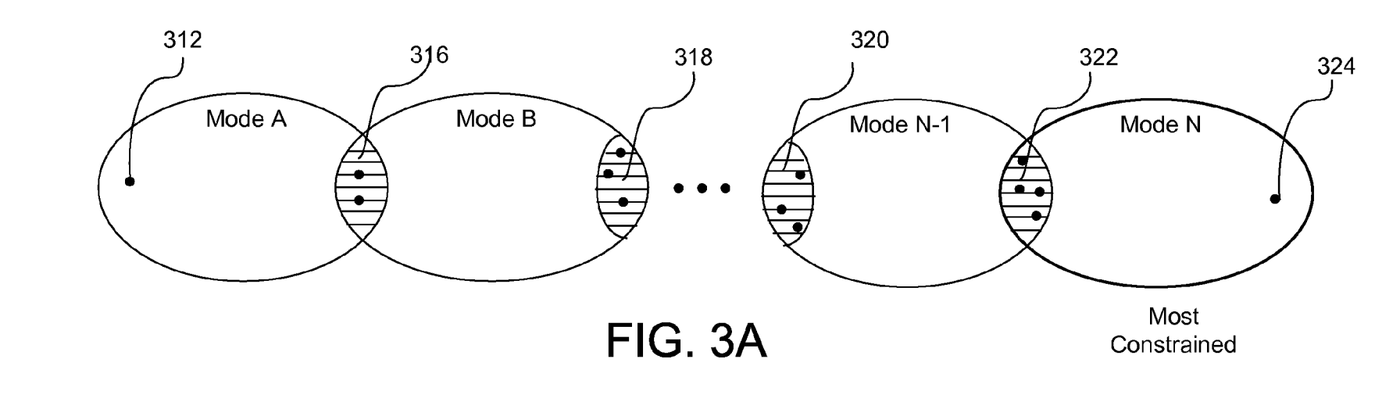
FIG. 3A is a diagram illustrating an example where the most constrained mode appears as the last mode, according to one embodiment of the present invention.

FIG. 3A is a diagram illustrating an example where the most constrained mode appears as the last mode N. The robot 130 operates in modes A through N in a sequence. Specifically, the robot 130 starts at an initial configuration 312 in mode A, and then proceeds to mode B and other subsequent modes, ending at mode N. A target configuration 324 is in mode N. The robot 130 must transition between modes via transition configurations sampled from candidate transition configurations 316, 318, 320, and 322 shown as hashed area of ellipses representing configurations for a mode. The dots in the transition configurations 316, 318, 320, and 322 represent transition configurations that are sampled to search for the path of configurations (i.e., a series of configurations to be taken by the robot 130) between the initial configuration 312 and the target configuration 324. In the example of pushing described above with reference to FIGS. 1 through 2B, the most constrained mode is the pushing mode.

To obtain a path of configurations, a transition configuration is sampled from the candidate transition configurations 322. After the transition configuration is sampled, a single-mode planning is performed within the mode N to determine if there is a path of configurations to the target configuration 324 within the mode N. If there is a path, then searches for path of configurations to the initial configuration 312 is performed by expanding a tree of nodes that represent the transition configurations for various modes. If there is no path between the sampled transition configuration and the target configuration 324, then other transition configurations are sampled from the candidate transition configuration. By starting and expanding the search from the most constrained mode, paths of configurations unlikely to result in feasible transition configurations in the most constrained mode are discarded before further investigation. Because the most constrained mode requires the most amounts of resources, starting and expanding the search from effective transition configurations of the most constrained mode reduces resources wasted on planning for path that fails to yield effective paths in the most constrained mode.

Figure 3B:
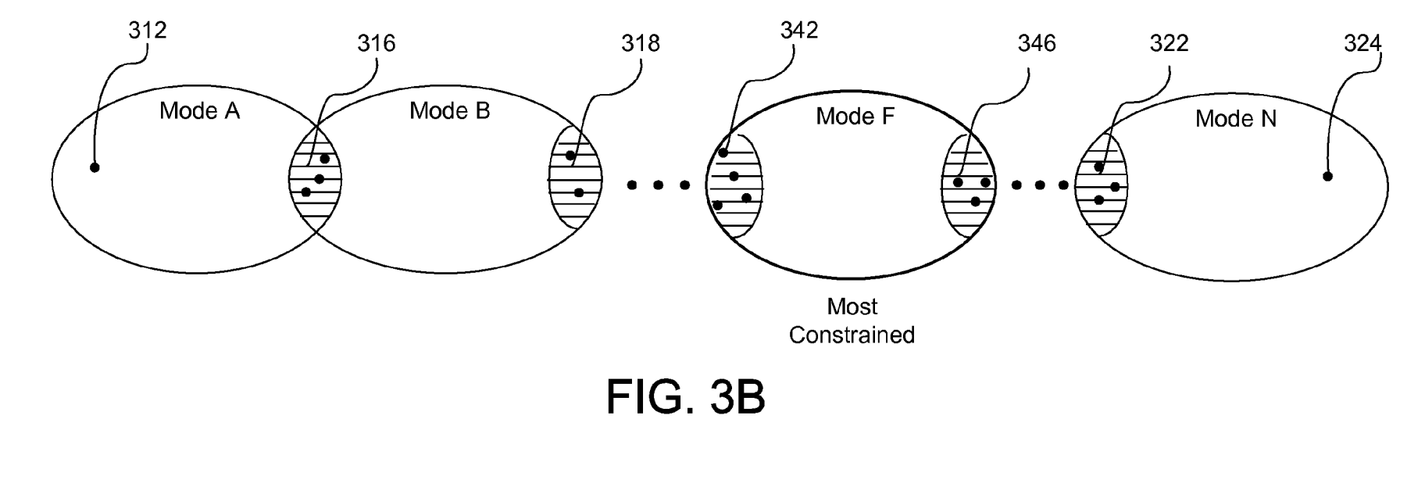
FIG. 3B is a diagram illustrating another example where the most constrained mode appear between the first mode and the last mode, according to one embodiment of the present invention.

FIG. 3B is a diagram illustrating another example where the most constrained mode F appear as an intermediate mode between the first mode A and the last mode N. The example of FIG. 3B is the same as the example of FIG. 3A except that the mode F, having candidate transition configurations 342 and 346, is the most constrained mode. First transition configurations are sampled from the candidate transition configuration 342. Second candidate transition configurations are also sampled from the candidate transition configuration 346. The dots in hashed area 342 of mode F represent sampled first transition configurations. The dots in hashed area 346 of mode F represent sampled second transition configurations. After sampling the first and second transition configurations from the candidate transition configurations 342 and 346, a single-mode planning is performed to find any path of configurations between the first and second transition configurations.

The first transition configurations and the second transition configurations that do not produce any feasible path of configurations between them are discarded from further investigation. Conversely, combinations of the first and second transition configurations that produced paths of configurations become nodes of a tree for expanding toward the initial configuration 312 or the target configuration 324.

Regardless of whether the most constrained mode appears as the last mode (as in the example of FIG. 3A) or somewhere between the first mode and the last mode (as in the example of FIG. 3B), the paths of configurations between the initial configuration 312 and the target configuration 324 are searched more efficiently by first sampling the transition configurations for the most constrained mode, and then expanding the search to a series of configurations in other modes. By searching for high utility paths in the most constrained mode first, less resource is wasted on searching paths for other less constrained mode that leads only to a non-feasible or low utility path in the most constrained mode.

Example Architecture of Subject Device

Figure 4:
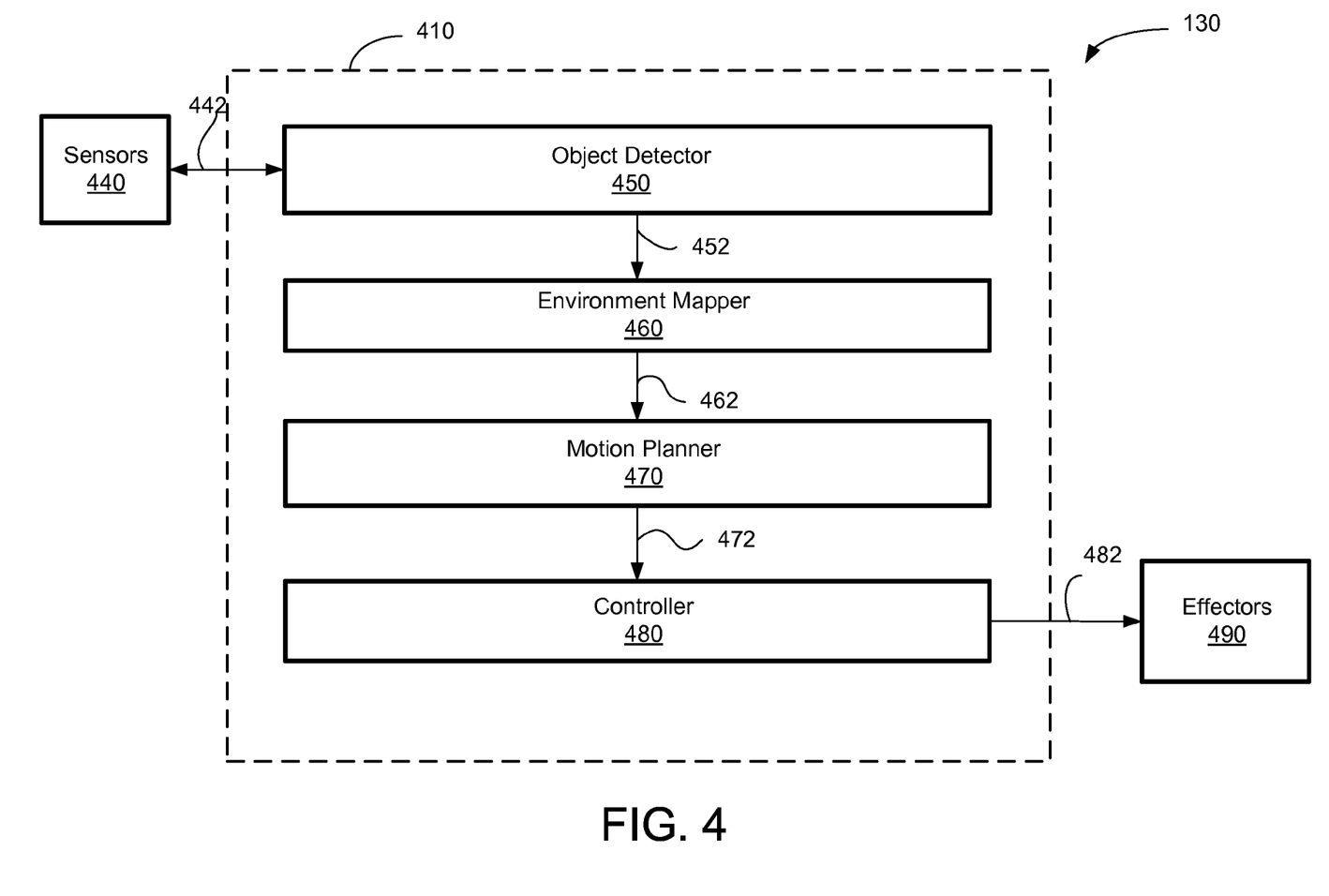
FIG. 4 is a block diagram illustrating components of a robot, according to one embodiment of the present invention.

FIG. 4 is a block diagram illustrating components of a robot 130, according to one embodiment of the present invention. The robot 130 includes, among other components, sensors 440, a computing module 410, and effectors 490. The computing module 410 receives sensor signals 442 from the sensors 440 to determine its location and orientation relative to various objects in the environment surrounding the robot as well as determine the current configurations of the robot. The sensors include, among other components, image sensors, linear sensors and rotary sensors for determining the position and orientation of one body segment (e.g., arm) with respect to another body segment (e.g., upper arm). In one or more embodiments, the sensor signals 442 may function as feedback signals to control the motions of the robot 130.

The effectors 490 include, among others, motors, hydraulic actuators, solenoids, and other components for causing physical changes in the configuration of the robot 130.

The computing module 410 identifies the current configuration of the robot 130, plans motions to accomplish certain tasks, and executes the planned motions by sending generated effector signals 482 to the effectors 490. In one embodiment, the computing module 410 includes, among other components, an object detector 450, an environment mapper 460, a motion planner 470, and a controller 480.

The object detector 450 determines identity and/or the location of objects in the environment. In one or more embodiments, the object detector 450 is implemented using techniques, for example, as disclosed in copending U.S. patent application Ser. No. 12/124,016 entitled "Rectangular Table Detection Using Hybrid RGB and Depth Camera Sensors," filed on May 20, 2008.

The environment mapper 460 maintains and tracks information about the objects in the surroundings of the robot 130. Specifically, the environment mapper 460 receives object information 452, and maps the objects 110, 112 to three-dimensional coordinates. The environment mapper 460 may store information regarding shape or geometry information (e.g., width, height, and length of objects) and locations of the object as detected by the robot 130. In one embodiment, the environment mapper 460 also stores information about location and attributes (e.g., length, width and height) of objects that is provided by a user or other sources. The environment mapper 460 provides environment information 462 to the motion planner 470. The environment information 462 includes the information concerning location and profiles of the objects in the surroundings of the robot 130.

The motion planner 470 receives the environment information 462 and generates a motion plan (e.g., walk to a location via a certain path) to be executed by the robot 130. Based on the plan, the motion planner 470 sends commands 472 (e.g., bend the leg joint by 30 degrees) to the controller 480. The controller 480 then sends control signals 482 to various effectors 490 instructing the effectors 490 to perform certain motions.

Components of Motion Planner

Figure 5:
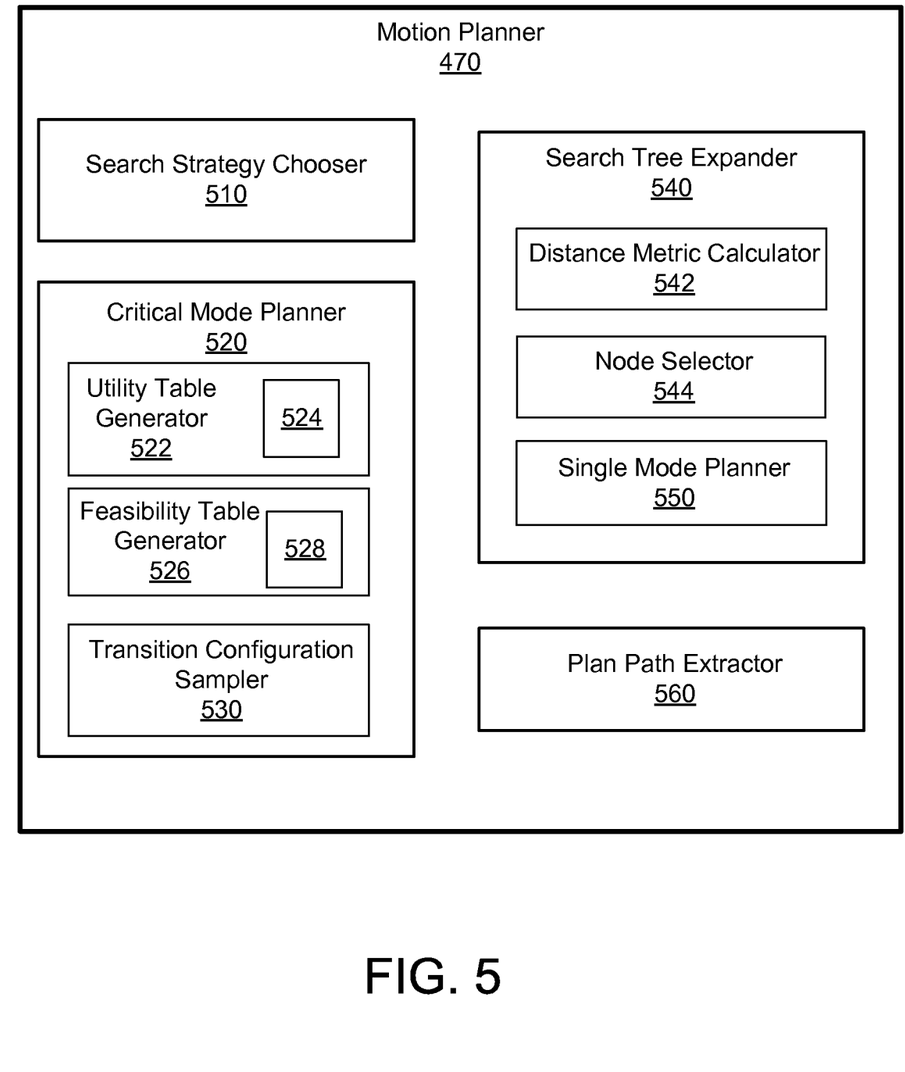
FIG. 5 is a block diagram illustrating components of a motion planner, according to one embodiment of the present invention.

FIG. 5 is a block diagram illustrating the motion planner 470, according to one embodiment of the present invention. The motion planner 470 includes, among other components, a search strategy chooser 510, a critical mode planner 520, a search tree expander 540, and a plan path extractor 560. The search strategy chooser 510 selects one search strategy among multiple search strategies for searching and planning paths of configurations depending on priorities given weight under the circumstances. For example, if the least computation time is given the highest priority, a search strategy known to generate paths within the shortest time may be selected. If the speed of accomplishing the task after executing planned motions on the robot 130 is given the highest priority, a search strategy known to generate the most efficient paths may be selected. The search strategy chooser 510 also determines the modes to be taken by the robot 130 to reach the target configuration. The search strategy may determine the sequence of modes, for example, based on conditions imposed on operations in different modes.

The critical mode planner 520 searches for transition configurations in the most constrained mode. In the example of FIG. 3A, the critical mode planner 520 searches for the path of configurations between the transition configuration 322 and the target configuration 324. In the example of FIG. 3B, the critical mode planner 520 searches for the path of configurations between a configuration sampled from the transition configurations 342 and a configuration sampled from the transition configurations 346. In one embodiment, the critical mode planner 520 is specialized and adapted to generate paths for only a certain mode of operation (e.g., push mode). In another embodiment, the critical planner 520 may be used to generate paths for a number of operations.

The critical mode planner 520 includes, among other components, a utility table generator 522, a feasibility table generator 526, and a transition configuration sample 530. The utility table generates and stores utility for the transition configurations of the most constrained mode. The utility represents changes in configuration effective in reaching the target configuration within the most constrained mode. In one embodiment, the utility is determined by computing the average metric distance that can be taken from the starting transition configuration sampled from the transition configuration 322.

The feasibility table generator 526 generates a feasibility table 528 indicating whether a starting transition configuration in the most constrained mode is feasible and can actually be taken while complying with various constraints. Certain transition configuration may not be taken by the robot 130 because of, among other reasons, collision between different parts of the subject device, obstacles or kinematics constraints such as the reachability of an end effector to a particular location. The feasibility table 528 stores information on whether a certain starting transition configuration violates such constraints. For example, the feasibility table 528 may indicate a value of 1 for transition configurations that does not violate any constraints and a value of 0 for transition configurations that violate such constraints. In one embodiment, the feasibility table 528 is combined with the utility table 524, for example, as described below in detail with reference to FIG. 7. In one embodiment, the utility table 524 and the feasibility table 528 are precomputed and stored for reference by the transition configuration sampler 530.

Figure 6A:
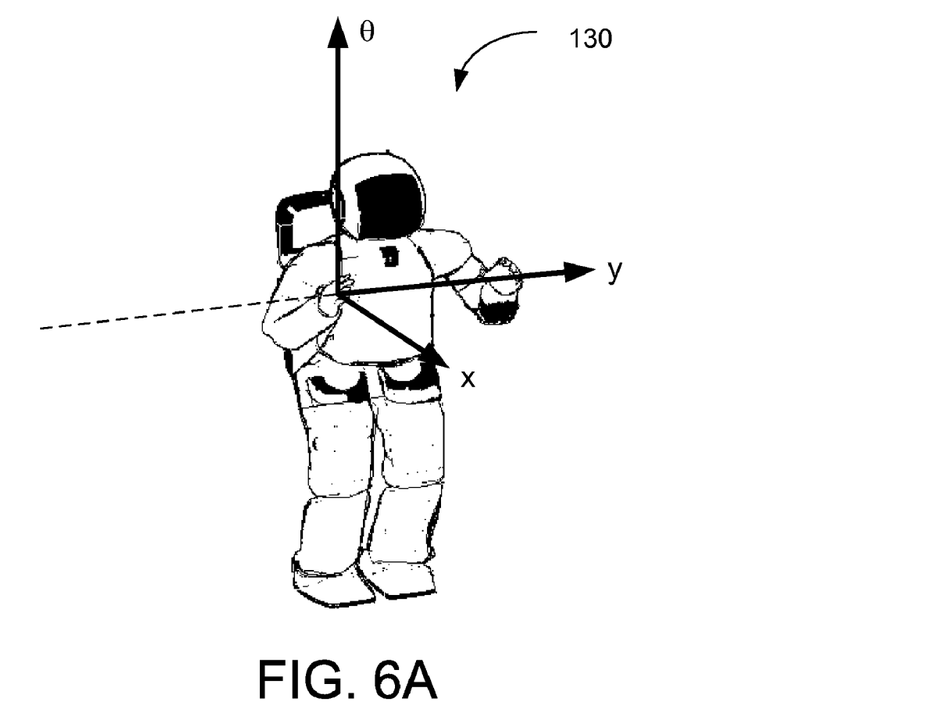
FIGS. 6A and 6B are diagrams illustrating a coordinate system for describing operation in a push mode, according to one embodiment of the present invention.
Figure 6B:
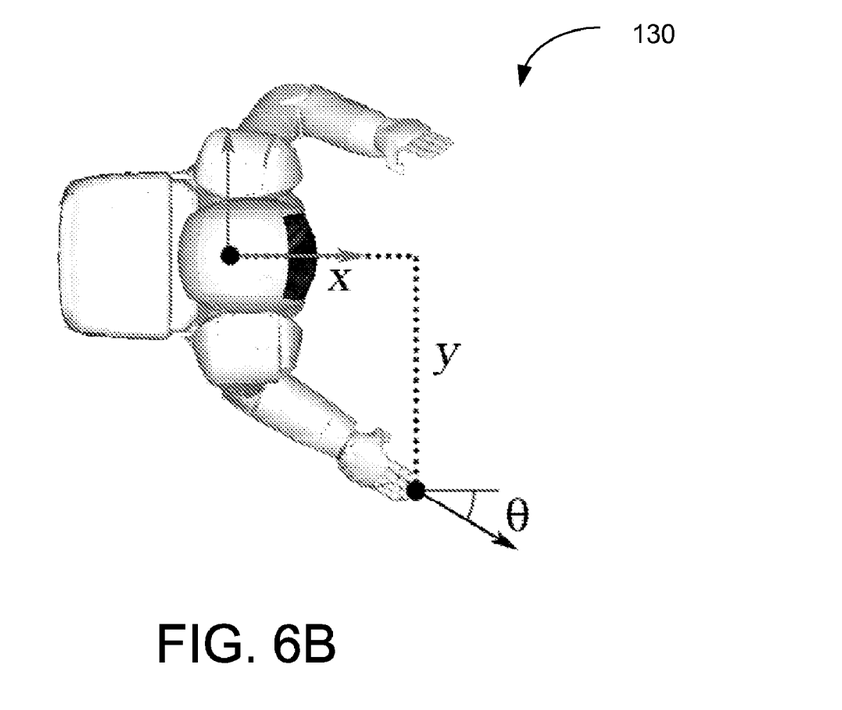

The processes of generating the utility table 524 and the feasibility table 528 are described herein with reference to pushing of the object 112 placed on the table 110 using a hand of the robot 130. A three dimensional space of configuration including x, y, and θ are defined for a pushing operation, as illustrated in FIGS. 6A and 6B. x, y and θ define a coordinate system for the robot where x-axis is parallel to the direction the robot 130 is facing, y indicates the horizontal displacement normal to the x-axis, and θ indicates the orientation of a normal vector at the tip of the hand contacting the object 112.

When pushing the object 112 using a hand, the normal vector at the tip of the hand (e.g., finger, palm or knuckle) touching the object 112 must be horizontal. Otherwise, the object 112 may be tipped over and a stable push may not be performed. The height of the tip of the hand must also be fixed because raising the tip of the hand during pushing may also tip over the object 112 and lowering the tip of hand may cause the hand to collide with the surface of the table 110.

The feasibility table generator 526 may first initialize all entries to zero (0) (constraints violated) for all transition configurations 322. In one embodiment, a sample configuration from a robot arm's degrees of freedom is created and inverse kinematics is performed for the sampled configuration to determine (i) whether the hand may be brought to a height where contact with the object can be made, and (ii) a vector normal to the point of contact between the object 112 being pushed and the tip of the hand can be oriented horizontally. If the height can be brought to the fixed height and the normal vector can be oriented horizontally, a check is performed to confirm whether other constraints are also satisfied. Other constraints may include, among others, that there is no self-collision, the tip of the hand touching the object lies in the robots' field of view, and there is no collision with other obstacles. If all the constraints are satisfied, the entry for the sampled transition configuration is changed to one (1) to indicate that this transition configuration is feasible.

The utility table generator 522 computes the utility for the push operation. In one embodiment, the utility for a transition configuration is computed as the expected distance an object can be pushed from the transition configuration in the absence of obstacles. The utility can be estimated, for example, by performing a Monte Carlo integration over configurations from which push can be performed. The Monte Carlo integration allows computation of the average path length an object can be pushed from a particular location. The information about whether push can be performed from a configuration is stored in the feasibility table 528 The estimates of the utility are stored in the utility table 524 for each starting position computed.

When an object is pushed, the object traces out a helix that rotates around a center of rotation (COR). An assumption is made of a prior probability Π over stable CORs for a reasonable range of physical parameters of the object 112 such as mass of the object, friction between the effector surface and object surface, and density distribution of an object. Probability Π indicates the range of possible directions that an object can take if pushed from a position. The physical parameters may be simplified to be of uniform distribution to facilitate analysis.

Starting from $w_0=(x, y, \theta)$, a path $w_0, w_1, \ldots, w_k$ is generated where each of the k+1 points in the path $w_0, w_1, \ldots, w_k$ represent configurations of the hand contact points that can be reached by pushing the object from the previous contact point in the path. For example, $w_1$ can be reached from $w_0$, and $w_2$ can be reached from $w_1$. The sequence terminates when the feasibility (i.e., reachability) at $w_{k+1}$ becomes zero (0). After generating a number of paths, the average length is calculated and stored in the utility table 524.

Figure 7:
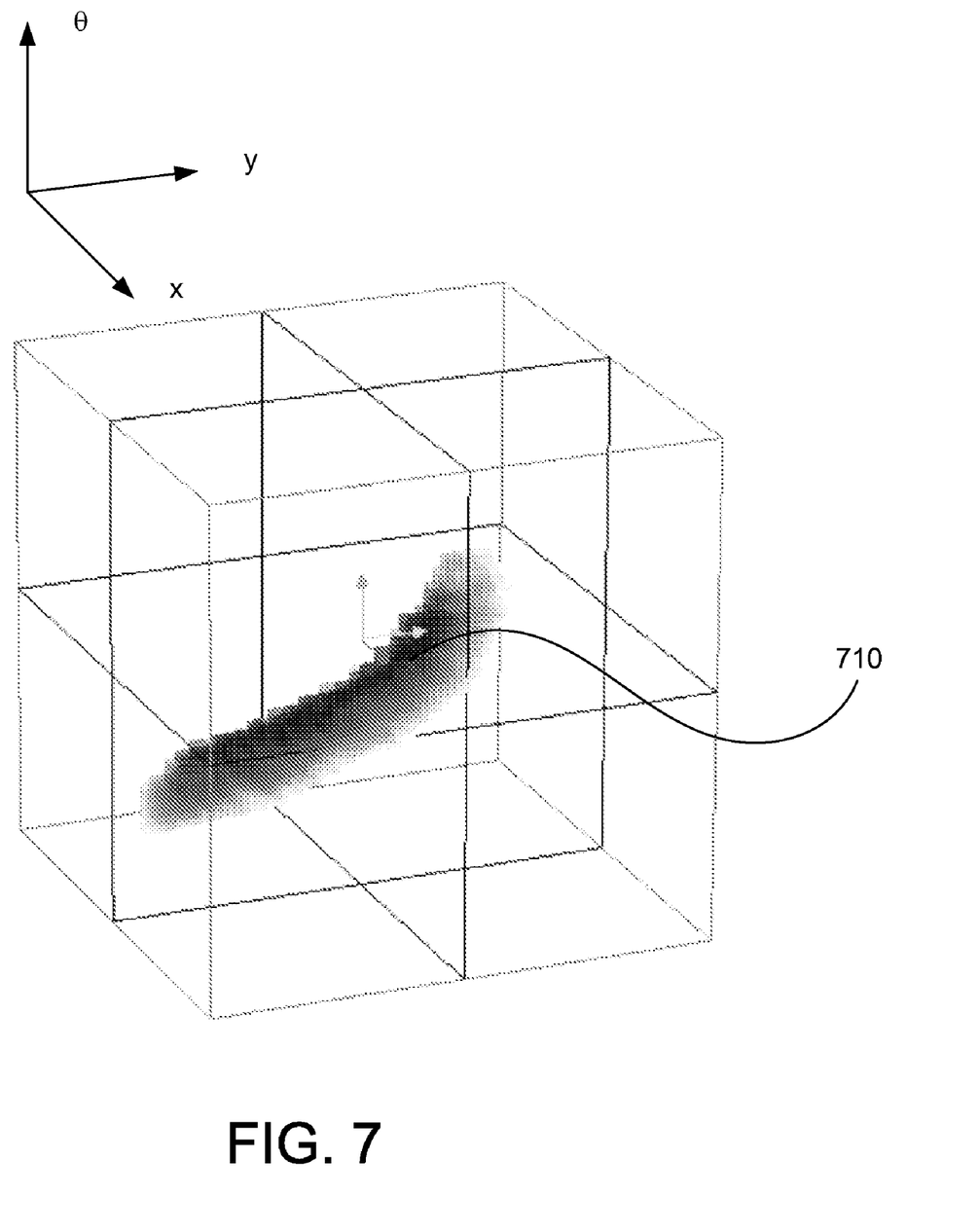
FIG. 7 is a diagram illustrating a utility table, according to one embodiment of the present invention.

FIG. 7 is a diagram illustrating entries of the utility table 524 in the form of a three dimensional graph for push operation using a tip of an open right hand, according to one embodiment of the present invention. A cloud of dots 710 represents utility and feasibility of the transition configurations that can be obtained by an open right hand of the robot 130 (i.e., the entry in the feasibility is one (1)). The portions of the cloud 710 with darker area indicate the transition configuration with higher utility whereas the portions of the cloud 710 with lighter color indicate the transition configuration with lower utility. Blank area outside the cloud 710 represents the transition configurations that are not feasible because of one constraint or another. A similar utility table 524 may be generated for a left hand of the robot 130 and other hand configurations of the robot (e.g., closed hand or pushing by palm of the hand).

After generating the utility table 524 and the feasibility table 528, the transition configuration sampler 530 samples the transition configuration for obtaining the paths of configurations in the most constrained mode based on the precomputed utility and feasibility of the transition configuration. Specifically, the transition configuration sampler 530 samples a transition configuration from the set of feasible configurations whose feasible table 528 entries are equal to one (1) with probability proportional to the utility of the configuration as defined by the corresponding entry in the utility table 524. Referring to FIG. 7, the transition configurations marked with a darker color are more likely to be sampled compared to the transition configurations marked with a lighter color. Because the transition configurations are sampled randomly based on this utility distribution over feasible configurations rather than a uniform discretized grid, the chances of finding successful transition configurations that result in good pushing performance is increased.

After the transition configuration is sampled, the critical mode planner 520 plans a series of configurations to be taken within the most constrained mode 520 using a single mode planner 550, as described below in detail.

The search tree expander 540 functions to expand nodes of a tree representing transition configurations between the initial configuration 312 and the target configuration 324. A node of the tree represents a transition configuration between the modes. First, the search tree expander 540 samples a configuration $q_{rand}$ in the configuration space. The configuration $q_{rand}$ may be sampled randomly or it may be chosen to coincide with the target configuration of the object being manipulated by the subject device. The distances between the sampled configuration $q_{rand}$ the nodes of the tree are computed to select a node closest in distance to the sampled configuration $q_{rand}$.

After selecting the node in the tree that is closest to the sampled configuration $q_{rand}$, the tree is expanded from this node towards the sampled configuration $q_{rand}$, possibly adding new nodes in the path.

The search tree expander 540 includes, among other components, a distance metric calculator 542 and a node selector 544. The distance metric calculator 542 computes the distance between the sampled configuration and the nodes in the tree. The distance between the sampled configuration and the nodes may be defined using a choice of metric that reflects the goal of the task. For example, in the push example described herein, the distance metric may be defined as the distance between the object configurations (i.e., the configuration of the object 112) of a node in the tree and the sampled configuration. The configuration of the robot 130 is ignored because the goal of the task is to move the object 112. After the distance is computed, the node selector 544 determines the node that is closest to the sampled configuration. The search tree expander 540 then selects a transition configuration between a mode of the selected node and its adjacent mode.

The transition configuration for transitioning from the mode of the selected node and a node adjacent to the selected node may be selected using a variety of methods. In one embodiment of the search tree expander 540, the transition configuration is randomly selected without any biasing. In another embodiment, intermediate mode transitions are sampled to find a path towards the mode transition selected by the transition configuration sampler 530 of the critical mode planner 520.

The single mode planner 550 of the critical mode planner 520 searches a single-mode path in the critical mode between the node and the sampled transition configuration. After confirming that there is a path between the configuration as represented by the node and the sampled transition configuration, the tree is expanded by adding sampled transition configurations as a node that is connected to an existing node closest to the sampled transition configurations. In one embodiment, if the distances to two or more nodes are identical, one node may be randomly selected and evaluated for connection to the sampled transition configuration.

The single mode planner 550 plans single-mode motions between the sampled transition configuration and a node of the tree after the transition configuration is sampled by the search tree expander 540. The single-mode planner 550 implements various single-mode planning algorithms such as probabilistic roadmap (PRM) method and potential field methods as disclosed, for example, in Oussama Khatib, "Real-Time Obstacle Avoidance for Manipulators and Mobile Robots," International Journal of Robotics Research, Vol. 5, No. 1, 1986, pp. 90-98, which is incorporated by reference herein in its entirety.

The plan path extractor 560 functions to generate the path of configurations after a path between the initial configuration 312 and the target configuration 324 is identified by expanding the tree. The plan path extractor 560 eliminates nodes that do not yield the path, and outputs a series of configurations the robot 130 should take in reaching the target configuration 324. Based on the series of configurations, the motion planner 470 may generate the commands 472 fed to the controller 480, as described above with reference to FIG. 4.

Method for Planning Multi-Modal Operations

Figure 8:
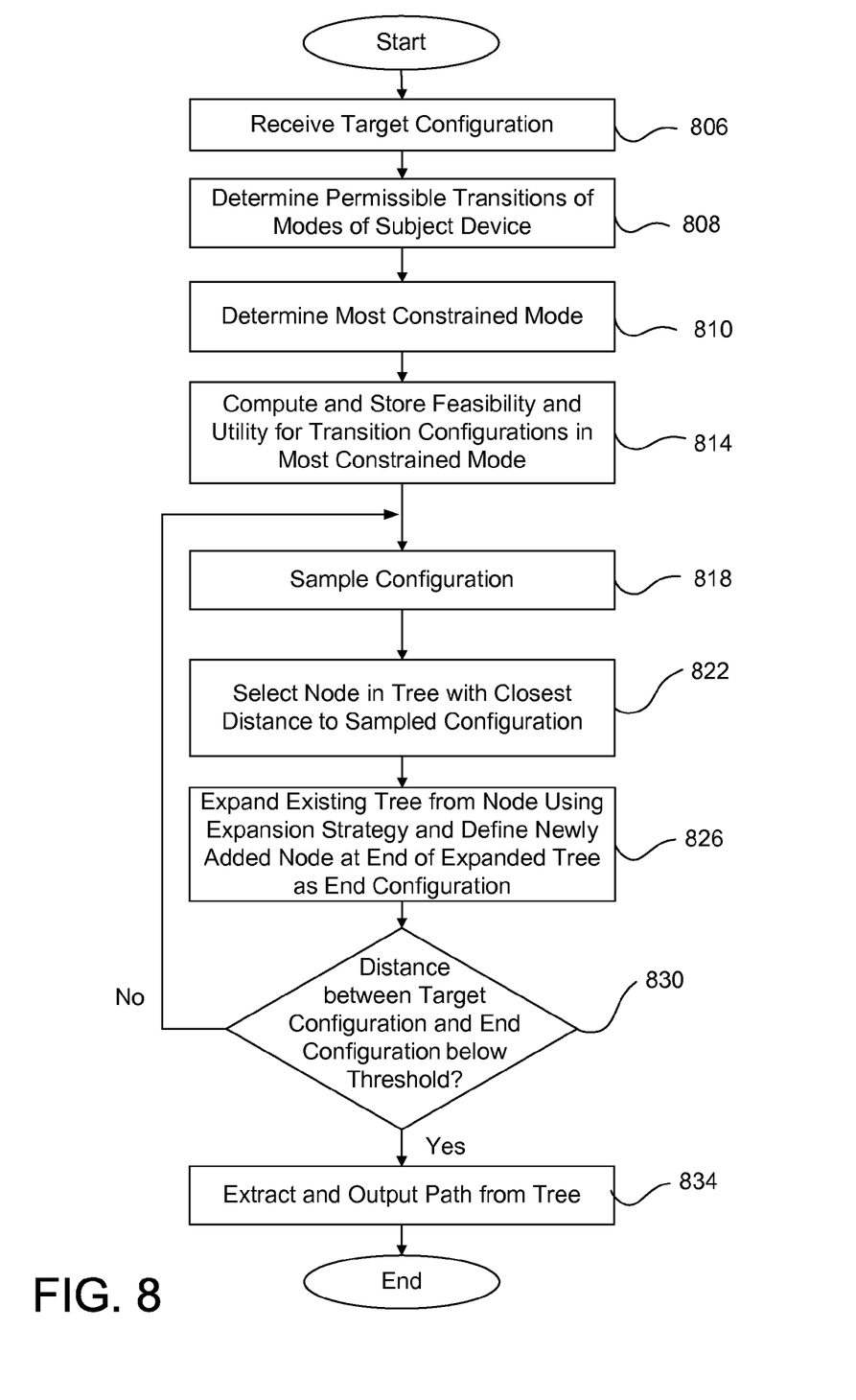
FIG. 8 is a flow chart illustrating a method of planning multi-modal motions, according to one embodiment of the present invention.

FIG. 8 is a flow chart illustrating a method of planning motions in multiple modes, according to one embodiment of the present invention. First, the target configuration is received 806 at the motion planner 470. In the example of pushing of an object to a location, the target configuration is defined in terms of the object configuration of the object being manipulated. In the example of pushing described above in detail, the object configuration may include horizontal coordinates and orientation of the object. The motion planner 470 determines 808 permissible transitions between modes of the robot 130, for example, as illustrated in FIG. 2A. Then, the motion planner 470 determines the most constrained mode in the path between the initial configuration 312 and the target configuration 324. The motion planner 470 computes and stores 814 feasibility of taking a transition configuration and the utility of the transition configuration.

A configuration $q_{rand}$ is then sampled 818 in the configuration space. The configuration $q_{rand}$ may be sampled randomly or it may be chosen to coincide with the target configuration of the object being manipulated by the subject device. A node in a search tree that is closest in distance to the sampled configuration $q_{rand}$ is selected 822. The tree is then expanded 826 from the selected node using expansion strategy. A node newly added at the end of the expanded tree is defined as an end configuration.

After the tree is expanded, it is determined 830 whether the distance between the target configuration and the end configuration in the tree is below a threshold. If the distance between the target configuration and the end configuration is below the threshold, the path of configurations from the initial configuration to the target configuration is extracted and outputted. If the distance between the target configuration and the end configuration of the tree is not below the threshold, then the process returns to the step 818.

Figure 9:
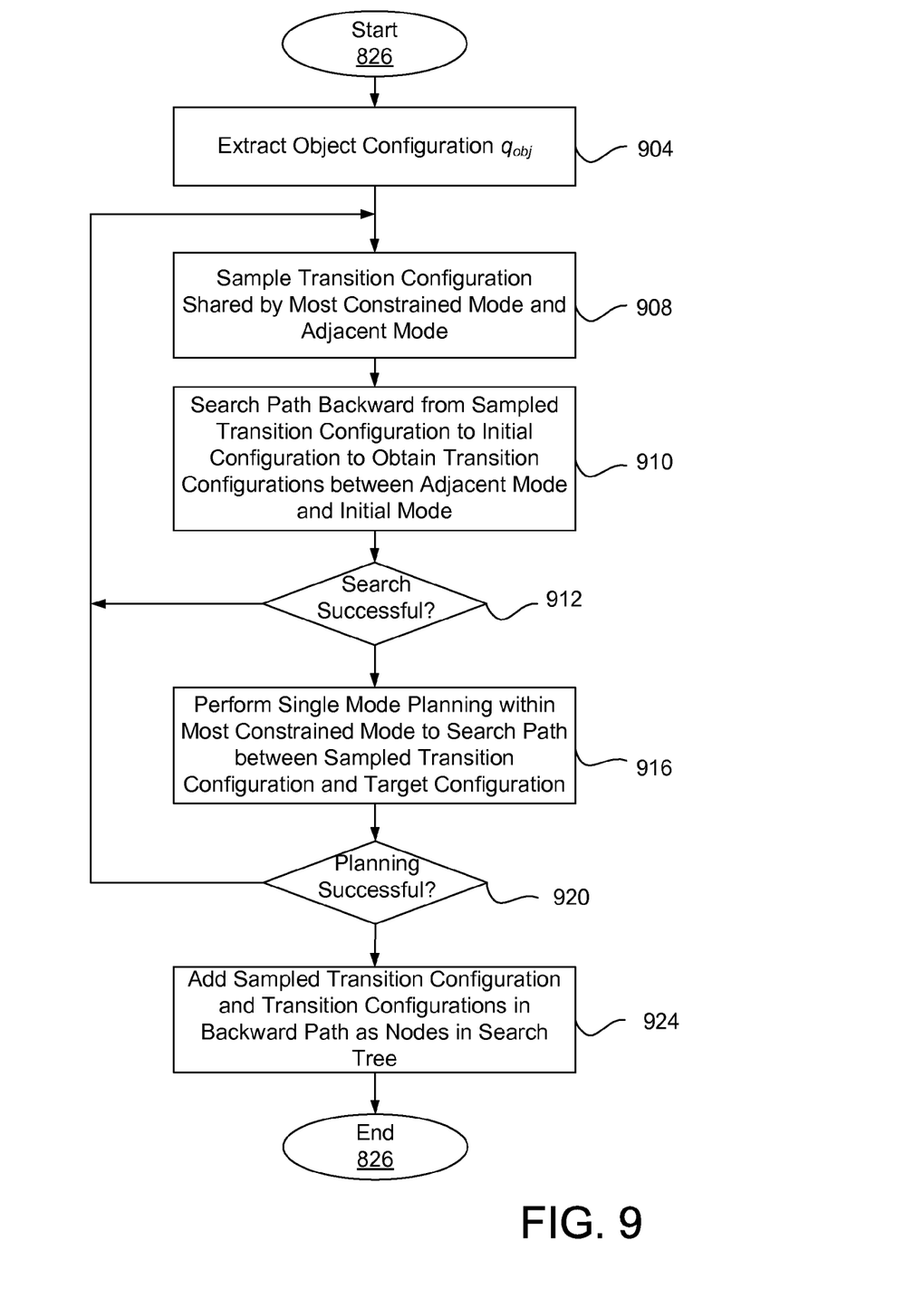
FIG. 9 is a flow chart illustrating a method of expanding a tree using expansion strategy, according to one embodiment of the present invention.

FIG. 9 is a flow chart illustrating a method of expanding the search tree using an expansion strategy, according to one embodiment of the present invention. First, the object configuration $q_{obj}$ is extracted 904 from the target configuration. Then a transition configuration shared by the most constrained mode (e.g., push mode) and an adjacent mode (e.g., reach/retract mode) is sampled 908. Sampling of the transition configuration may be biased so that transition configurations with higher utility are sampled with higher possibility. Transition configurations that are not feasible may also be excluded from sampling.

A search is performed 910 backward from the sampled transition configuration to initial configuration. Transition configurations in modes between the initial configuration and the mode adjacent to the most constrained mode are obtained. If it is determined 912 that the search for a path backward is successful, the process proceeds to perform 916 a single mode planning within the most constrained mode between the transition configuration sampled in step 908 and the target configuration. If it is determined 920 that the single path planning is successful, the transition configurations sampled in step 908 and the transition configurations successfully obtained in step 910 are added to the search tree 924.

If step 910, step 916 or both steps do no yield a successful path, the transition configurations are not added to the tree. Instead, the process returns to step 908 to sample another transition configuration and repeat the steps 910 through 920.

The steps of FIG. 9 may be performed in a different sequence. For example, step 910 of searching for the path backward from the sampled transition configuration to the initial configuration and step 916 of performing the single mode planning within the most constrained mode may be performed in parallel or in a reverse order (i.e., steps 916 and step 920 followed by steps 908 and 910).

Alternative Embodiments

In one embodiment, the motion planner 470 also implements a blind motion search strategy where the transition configurations are sampled at equal possibility without any bias. The blind motion search strategy does not involve computation of the feasibility or utility before sampling of the transition configuration. The blind motion search strategy, however, does not bias the sampling of the transition configuration to the transition configuration with higher utility. Therefore, the blind motion search strategy may result in more numbers of motions compared to the case where the sampling of the transition configurations was biased toward a higher utility.

In one embodiment, only the feasibility information of the transition configurations is precomputed and stored in the feasibility table 528. The utility of the transition configuration is not stored in the utility table 524. The feasibility information is then used to exclude non-feasible transition configurations from being sampled.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of planning motions for a subject device operable in two or more modes, each mode having a set of constraints on configuration of the subject device, comprising:
    receiving a target configuration of the subject device;
    selecting a first transition configuration of the subject device from candidate transition configurations shared by a most constrained mode of the two or more modes and a first mode adjacent to the most constrained mode, the first mode placed between the most constrained mode and a mode of an initial configuration;
    at a computing device, performing a first search for a first series of configurations from the first transition configuration to the initial configuration;
    performing a second search for a second series of configurations from the first transition configuration to the target configuration; and
    outputting the first and second series of configurations.

2. The method of claim 1, wherein performing the first search comprises:
    sampling a second transition configuration shared by the first mode and a second mode adjacent to the first mode, the second mode placed between the first mode and the mode of the initial configuration; and
    searching a third series of configurations of the subject device in the first mode between the first transition configuration and the second transition configuration using a single-mode planning.

3. The method of claim 1, further comprising generating and expanding a tree including nodes, each node representing a configuration that may be taken by the subject device to reach the target configuration from the initial configuration.

4. The method of claim 1, further comprising:
    determining feasibility of reaching transition configurations for the first transition configuration from the first mode; and computing utility of the candidate transition configurations for the first transition configuration, the utility representing changes in configuration effective in reaching the target configuration within the most constrained mode from the first transition configuration; and wherein selecting the first transition configuration comprises sampling a candidate transition configuration biased by the feasibility and the utility of the candidate transition configurations.

5. The method of claim 4, further comprising:
storing the determined feasibility for the candidate transition configurations in a feasibility table; and
storing the computed utility for the candidate transition configurations in a utility table.

6. The method of claim 1, wherein the target configuration is in the most constrained mode, and wherein the second search is performed using a single-mode planning.

7. The method of claim 1, wherein the most constrained mode comprises a mode for pushing an object.

8. A computer readable storage medium adapted to plan motions for a subject device, the computer readable storage medium structured to store instructions, when executed, cause a processor to:
receive a target configuration of the subject device, the subject device operable in two or more modes, each mode having a set of constraints on configurations that may be taken by the subject device;
determine two or more modes taken by the subject device to reach the target configuration from an initial configuration;
perform a first search for a first series of configurations from a first transition configuration of the subject device to the initial configuration of the subject device;
perform a second search for a second series of configurations from the first transition configuration of the subject device to the target configuration of the subject device; and
output the first and second series of configurations of the subject device.

9. The computer readable storage medium of claim 8, further comprising instructions to:
sample a second transition configuration shared by the first mode and a second mode adjacent to the first mode, the second mode placed between the first mode and the mode of the initial configuration; and
search a third series of configurations of the subject device in the first mode between the first transition configuration and the second transition configuration using a single-mode planning.

10. The computer readable storage medium of claim 8, further comprising instructions to generate and expand a tree including multiple nodes, each node representing a configuration that may be taken by the subject device to reach the target configuration from the initial configuration.

11. The computer readable storage medium of claim 8, further comprising instructions to:
determine feasibility of reaching transition configurations for the first transition configuration from the first mode; and
compute utility of the candidate transition configurations for the first transition configuration, the utility representing changes in configuration effective in reaching the target configuration within the most constrained mode from the first transition configuration; and
wherein the instructions to select the first transition configuration comprise instructions to sample a candidate configuration biased by the feasibility and the utility of the candidate transition configurations.

12. The computer readable storage medium of claim 11, further comprising instructions to:
store the determined feasibility for the candidate transition configurations in a feasibility table; and
store the computed utility for the candidate transition configurations in a utility table.

13. The computer readable storage medium of claim 8, wherein the target configuration is in the most constrained mode, and wherein the second search is performed using a single-mode planning.

14. The computer readable storage medium of claim 8, wherein the most constrained mode comprises a mode for pushing an object.

15. A system for planning motions for a subject device operable in two or more modes, each mode having a set of constraints on configurations that may be taken by the subject device, comprising:
a critical mode planner adapted to select a first transition configuration of the subject device from candidate transition configurations shared by a most constrained mode of the two or more modes and a first mode adjacent to the most constrained mode, the first mode placed between the most constrained mode and a mode of an initial configuration; and
a search tree expander adapted to perform a first search for a first series of configurations from the first transition configuration to the initial configuration;
a single mode planner adapted to perform a second search for a second series of configurations from the first transition configuration to the target configuration; and
a plan path extractor adapted to output a first and second series of configurations.

16. The system of claim 15, wherein the search tree expander is further adapted to:
sample a second transition configuration shared by the first mode and a second mode adjacent to the first mode, the second mode placed between the first mode and the mode of the initial configuration; and
search a third series of configurations of the subject device in the first mode between the first transition configuration and the second transition configuration using a single-mode planner.

17. The system of claim 15, the tree expander is further adapted to generate and expand a tree including multiple nodes, each node representing a configuration that may be taken by the subject device to reach the target configuration from the initial configuration.

18. The system of claim 15, wherein the critical mode planner is further adapted to:
determine feasibility of reaching transition configurations for the first transition configuration from the first mode; and
compute utility of the candidate transition configurations for the first transition configuration, the utility representing changes in configuration effective in reaching the target configuration within the most constrained mode from the first transition configuration; and
sample a candidate configuration biased by the feasibility and the utility of the candidate transition configurations.

19. The system of claim 18, further comprising:
a feasibility table adapted to store the determined feasibility for the candidate transition configurations; and
a utility table adapted to store the computed utility for the candidate transition configurations.

20. The system of claim 15, wherein the target configuration is in the most constrained mode, and the search tree expander is adapted to perform the second search using a single-mode planner.

21. The system of claim 15, wherein the most constrained mode comprises a mode for pushing an object.

* * * * *